US005956242A

United States Patent [19]

Majid et al.

[11] Patent Number: 5,956,242

[45] Date of Patent: Sep. 21, 1999

[54] SWITCHED-MODE POWER SUPPLY HAVING A SAMPLE-AND-HOLD CIRCUIT WITH IMPROVED SAMPLING CONTROL

[75] Inventors: Naveed Majid, Mohegan Lake, N.Y.; Ton Mobers, MS Grave, Netherlands

[73] Assignee: Philips Electronics North America Corporation, New York, N.Y.

[21] Appl. No.: 09/107,182

[22] Filed: Jun. 29, 1998

[51] Int. Cl.[6] .............................. H02M 3/335; H02M 3/24

[52] U.S. Cl. .............................. 363/21; 363/78; 363/97; 323/902

[58] Field of Search .............................. 363/20, 21, 78, 363/97; 323/902, 285

[56] References Cited

U.S. PATENT DOCUMENTS

| | | | |
|---|---|---|---|
| 4,685,042 | 8/1987 | Severinsky | 363/41 |
| 5,748,462 | 5/1998 | Schoofs | 363/21 |
| 5,757,627 | 5/1998 | Faulk | 363/21 |
| 5,768,118 | 6/1998 | Faulk et al. | 363/72 |
| 5,841,641 | 11/1998 | Faulk | 363/21 |

*Primary Examiner*—Peter S. Wong
*Assistant Examiner*—Bao Q. Vu
*Attorney, Agent, or Firm*—Edward W. Goodman

[57] ABSTRACT

A switched-mode power supply includes a transformer having a primary winding, a secondary winding and an auxiliary winding. A switching device is included in series with the primary winding for alternately interrupting the flow of current through the primary winding. The switched-mode power supply further includes a controller circuit connected to the auxiliary winding for receiving information related to an output voltage across the secondary winding and for controlling the switching of the switching device so as to maintain the information at a desired level. The controller circuit including a sample-and-hold circuit which is controlled to sample the information related to the output voltage only when there is current flowing in the secondary winding.

4 Claims, 5 Drawing Sheets

92 CURRENT MIRROR
98 CURRENT MIRROR
94 .83xIREF
100 IREF
Sw4
VCTRL
C15
DMAG
90
T1
T2
T3
95
96 LOGIC CIRCUIT
102 I1
108 I1
Sw5
Sw7
106
112
C16
C17
Sw6
Sw8
104 I2
110 I2

FIG. 4A
g1 g1
FIG. 4B
FIG. 4C
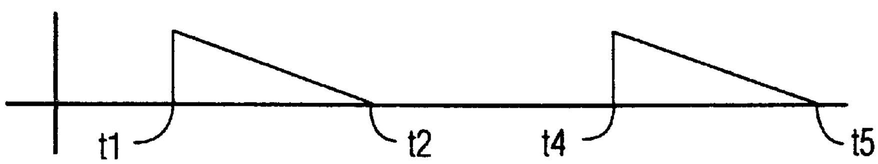
FIG. 4D
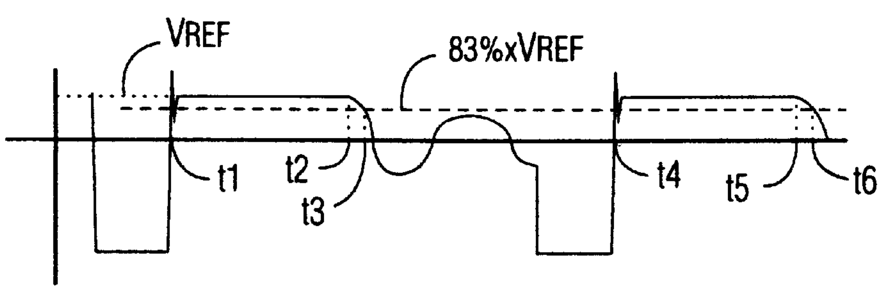
FIG. 4E
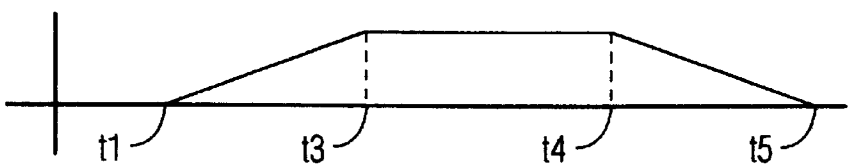
FIG. 4F
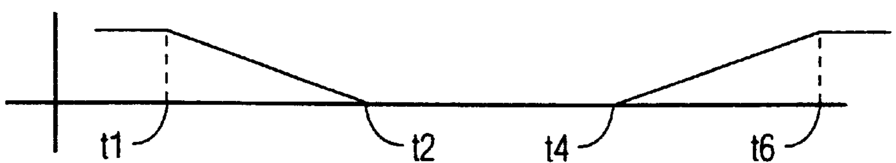
FIG. 4G
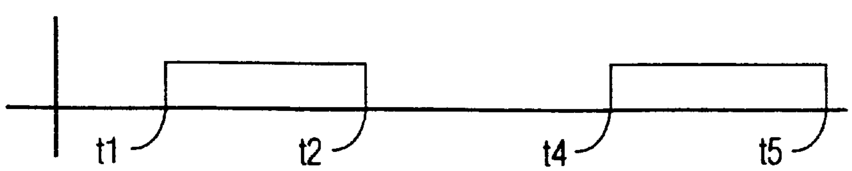

SWITCHED-MODE POWER SUPPLY HAVING A SAMPLE-AND-HOLD CIRCUIT WITH IMPROVED SAMPLING CONTROL

BACKGROUND OF THE INVENTION

1. Field of the Invention

The subject invention relates to a switched-mode power supply which stabilizes an output voltage by sampling feedback information during a certain time interval.

2. Description of the Related Art

U.S. patent application Ser. No. 08/927,831, filed Sep. 11, 1997, now U.S. Pat. No. 5,831,839 (Attorney Docket No. PHN 16,282), discloses a switched-mode power supply which comprises a transformer with a primary winding and a secondary winding. The primary winding is connected to an input supply voltage via a switching device in order to obtain a periodically interrupted primary current through the primary winding by opening and closing the switching device under the control of a drive signal. The secondary winding is connected, via a rectifying diode, to a parallel arrangement of a smoothing capacitor and a load to supply a DC output voltage to the load. The transformer also includes an auxiliary winding which, due to coupling with the secondary winding, supplies an auxiliary voltage which is closely related to the DC output voltage of the secondary winding during a period of time when the rectifying diode conducts. A controller circuit is coupled to the auxiliary winding and receives feedback information for generating a drive signal for the switching device.

The controller circuit includes a sample-and-hold circuit for periodically sampling a current in the auxiliary winding, and for storing the sampled signal on a storage element. A drive circuit, coupled to the storage element, determines the drive signal for the switching device based on the sampled signal stored on the storage element. It is the object of the storage element to store an averaged sampled signal which is indicative of the DC output voltage. Due to the switching of the switching device, there are times when the auxiliary voltage drops below a regulation level. To prevent an erroneous level in the stored sampled signal, the sampling is only conducted when the current in the auxiliary winding is above a predetermined level which is equivalent to approximately 83% of the regulation level.

While this sampling control works adequately, Applicants have found that this type of control is subject to errors. In particular, the auxiliary voltage only remains at the intended level when there is current flowing in the secondary winding of the transformer. When this current drops to zero, the auxiliary voltage begins to ring. Any information sampled during the time that the auxiliary voltage is ringing is error information.

SUMMARY OF THE INVENTION

It is an object of the subject invention to provide a switched-mode power supply having a sampling circuit which avoids sampling when the auxiliary voltage is ringing.

This object is achieved in a switched-mode power supply comprising a transformer having a primary winding, a secondary winding, and an auxiliary winding, the secondary winding being coupled to a smoothing capacitor via a rectifier element to supply a DC output voltage; a switching device having a main current path arranged in series with the primary winding of the transformer; and a controller circuit having an output for supplying a drive signal to a control input of the switching device for periodically switching the switching device on and off, and an input coupled to the auxiliary winding of the transformer for receiving information indicative of the DC output voltage, said controller circuit controlling the on and/or off periods of the switching device in order to obtain a desired value of the information from the auxiliary winding in a steady state situation, wherein said controller circuit comprises a sample-and-hold circuit for periodically sampling said information at the input of said controller circuit; storage means coupled to an output of said sample-and-hold circuit for storing a sampling signal; and means coupled to said storage means for generating the drive signal applied to the output of said controller circuit; and wherein said sample-and-hold circuit comprises means for controlling said sample-and-hold circuit to sample said information when said switching device is off and only when current is flowing in said secondary winding.

BRIEF DESCRIPTION OF THE DRAWINGS

With the above and additional objects and advantages in mind as will hereinafter appear, the invention will be described with reference to the accompanying drawings, in which:

FIGS. 4A–4G show waveforms in the switched-mode power supply; and

DESCRIPTION OF THE PREFERRED EMBODIMENTS

Figure 1:
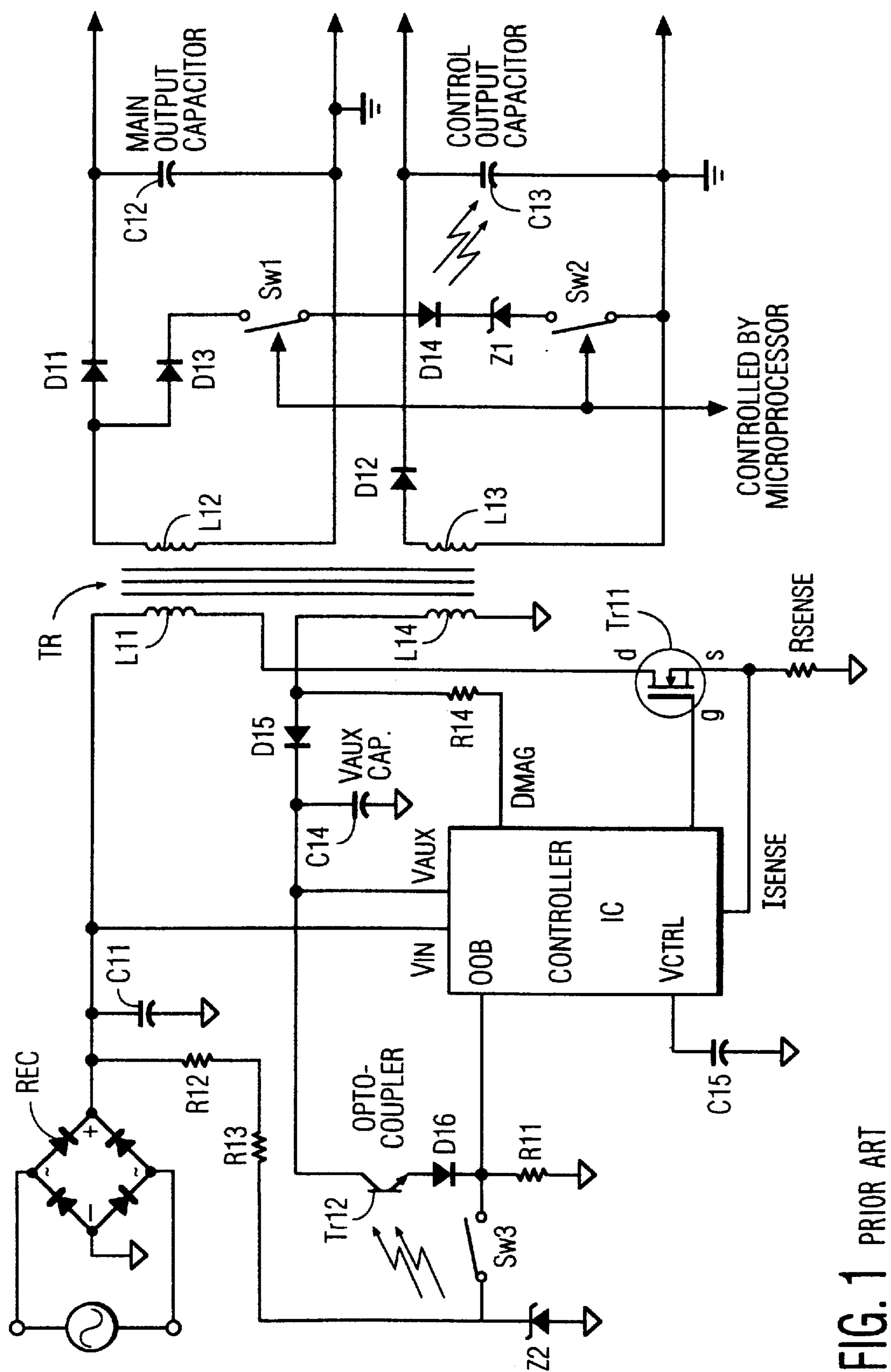
FIG. 1 is a schematic block diagram of a switched-mode power supply.

FIG. 1 shows a schematic diagram of a known switched-mode power supply. In particular, a diode rectifier bridge REC is connected to a line voltage source. An output from the rectifier bridge REC is connected to ground through a capacitor C11 and to one end of a primary winding L11 of a transformer TR. The other end of primary winding L11 is connected to one terminal of a switching device Tr11, the other terminal of which being connected to ground through a sense resistor $R_{SENSE}$. A first secondary winding L12 of the transformer TR has a first end and a second end connected to each other through a series arrangement of a diode D11 and a main output capacitor C12, the second end of the first secondary winding L12 also being connected to ground. A load (not shown) may be connected across the main output capacitor C12.

The transformer TR also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first primary winding L12 is also connected via a diode D13 and a controllable switch Sw1 to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR further includes an auxiliary primary winding L14 which has one end connected to a diode D15, and then to ground through a $V_{AUX}$ capacitor C14, to a $V_{AUX}$ input of a controller IC, and to one terminal of a light sensor Tr12 of the opto-coupler, the other terminal of the light sensor Tr12 being connected to ground via resistor R11, and to a stand-by mode detecting input (OOB)of the controller IC. In addition, a series arrangement of two resistors, R12 and R13, and a Zener diode Z2 connect the output of the rectifier bridge REC to ground. The junction between resistor R13 and Zener diode Z2 is connected to the OOB input via a power switch Sw3. The other end of the auxiliary primary winding L14 is connected to ground. The controller IC also has a $V_{IN}$ input connected to the output of the rectifier bridge REC, a $D_{MAG}$ input connected through a resistor R14 to the one end of the auxiliary primary winding L14, a driver output connected to the control input of switching device Tr11, an $I_{SENSE}$ input connected to the resistor $R_{SENSE}$, and a $V_{CTRL}$ terminal connected to ground by a discharge capacitor C15.

Figure 2:
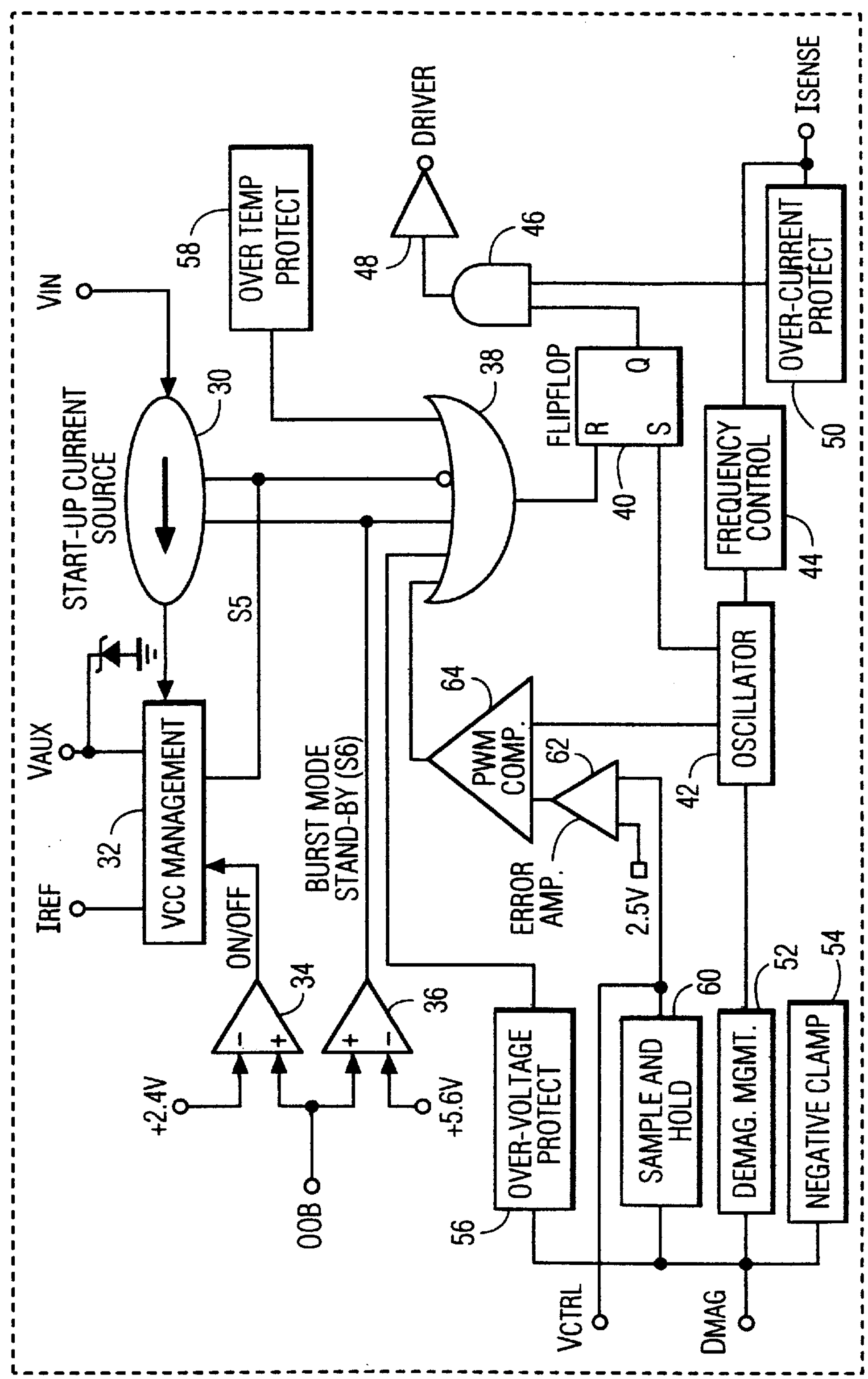
FIG. 2 is a block diagram of a controller used in the switched-mode power supply of FIG. 1.

FIG. 2 shows a block diagram of a known controller IC. The controller IC includes a start-up current source 30 coupled to the $V_{IN}$ input and a Vcc management circuit 32 connected to the $V_{AUX}$ and $I_{REF}$ inputs. The OOB input is connected to a first comparator 34 for comparing the voltage thereon to +2.4 V, and generates an "OFF/ON" signal. This OFF/ON signal is applied to an input of the Vcc management circuit 32. The OOB input is also connected to a second comparator 36 for comparing the voltage thereon to +5.6 V, for generating a "Burst Mode Stand-by" signal S6. This signal S6 is applied to the start-up current source 30 and to a first input of an OR-gate 38. An output (S5) from the Vcc management circuit 32 is also applied to the start-up current source 30 and to an inverting second input of OR-gate 38. An output from OR-gate 38 is applied to the reset input of an RS flip-flop 40, the set input being connected to an output of an oscillator 42 which is connected to the output of a frequency control circuit 44 having an input connected to the $I_{SENSE}$ input. The Q output from the RS flip-flop 40 is connected to one input of an AND-gate 46 which has an output connected to a driver 48 for driving the switching device Tr11. The other input of the AND-gate 46 is connected to the output of an over-current protection circuit 50 which monitors the current through the VDMOS via the $I_{SENSE}$ input. The $D_{MAG}$ input is connected to a demagnetization management circuit 52 and a negative clamp 54 for protection against saturation of the inductor in the power supply. The presence of demagnetization protection guarantees discontinuous conduction mode operation which simplifies the design of feedback control and gives faster transient response for the system. An output from the demagnetization management circuit 52 is connected to the oscillator 42. In addition, the $D_{MAG}$ input is connected to an over-voltage protection circuit 56 having an output connected to a third input of the OR-gate 38, which also has a fourth input connected to the output of an over-temperature protection circuit 58.

The $D_{MAG}$ input is also connected to a sample-and-hold circuit 60 the output of which is connected to the $V_{CTRL}$ terminal of the controller IC and to one input of an error amplifier 62 which receives a 2.5 V. reference voltage at another input. The output from the error amplifier 62 is connected to one input of a pulse width modulation (PWM) comparator 64 which receives an output from the oscillator 42 at a second input. The output from the PWM comparator 64 is connected to a fifth input of the OR-gate 38. The error amplifier 62 and the PWM comparator 64 form a PWM circuit which compares the voltage on the discharge capacitor C15, which is supposed to be a sampled representation of the output voltage, to the oscillator waveform to determine the duty cycle of the switching device.

Figure 3:
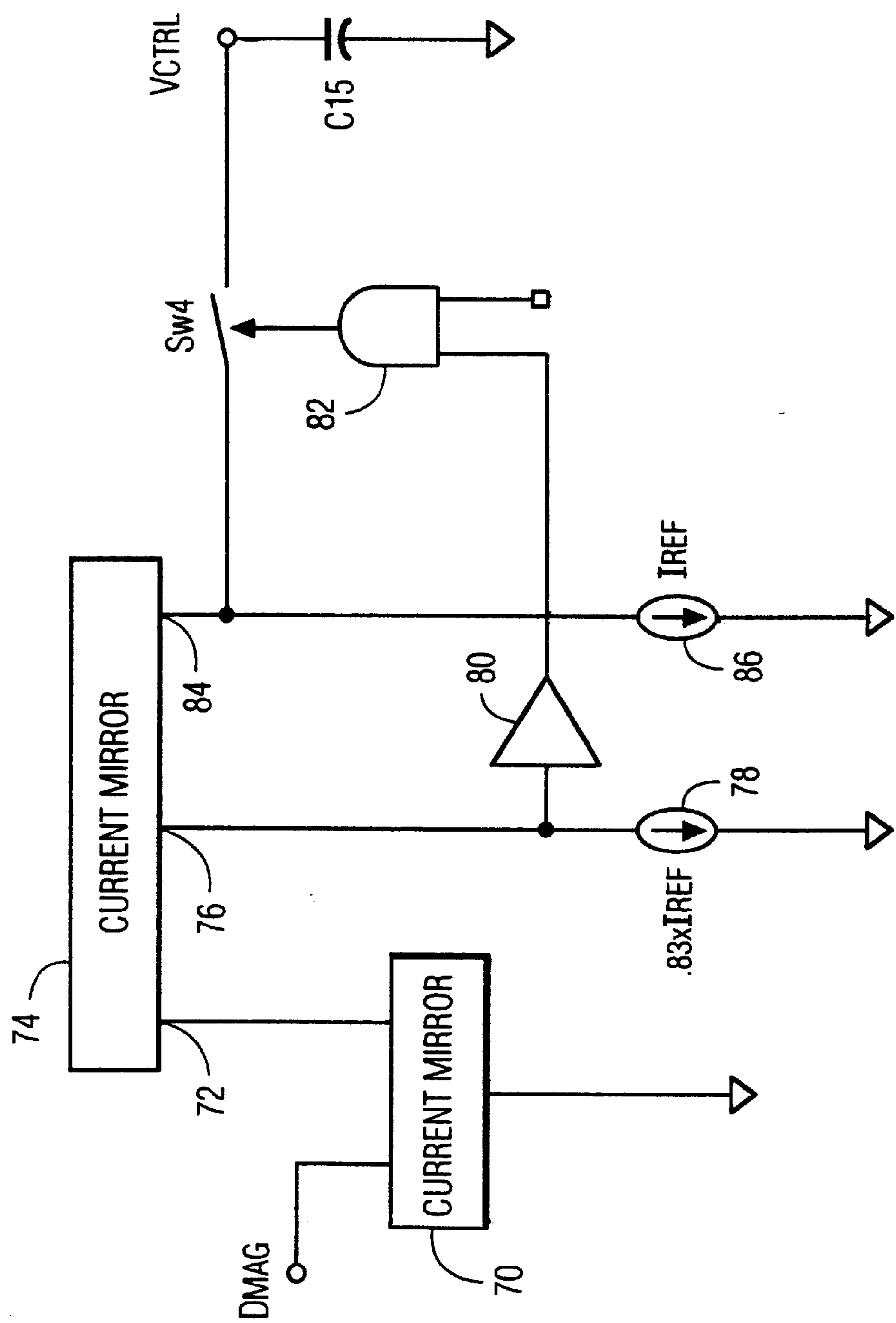
FIG. 3 is a schematic diagram of a prior art sample-and-hold circuit for use in the controller of FIG. 2.

FIG. 3 shows a schematic diagram of a sample-and-hold circuit in accordance with U.S. patent application Ser. No. 08/927,831, now U.S. Pat. No. 5,831,839 filed Sep. 11, 1997 (PHN 16,282). An input of the sample-and-hold circuit, connected to the $D_{MAG}$ input, is connected to a first current mirror 70 which is connected to ground. The current $I_{AUX}$ at the $D_{MAG}$ input is then mirrored to the output of the first current mirror 70 and is, in turn, applied to an input 72 of a second current mirror 74. A first output 76 of the second current mirror 74 is connected to ground via a first current source 78 which supplies a current $0.83^*I_{REF}$. The first output 76 is further connected to the input of a buffer 80 having an output connected to a first input of an AND-gate 82. A second output 84 of the second current mirror 74 is connected to ground via a second current source 86 which supplies a current $I_{REF}$, The second output 84 is also connected to an input terminal of a controllable switch Sw4 having an output terminal forming the output of the sample-and-hold circuit, and which is connected to the $V_{CTRL}$ terminal of the controller IC. An output from the AND-gate 82 is connected to a control input of the controllable switch Sw4. A second input of the AND-gate 82 receives a demagnetizing signal from a demagnitizing sensing circuit (not shown), the demagnetizing signal being high during demagnetization of the transformer and low during the remainder of the switching cycle.

FIGS. 4A–4G show various waveforms in the switched-mode power supply. In particular, FIG. 4A shows gate pulses generated by the controller IC which are applied to the gate of the switching device Tr11 causing the switching device Tr11 to periodically close. FIG. 4B shows a waveform of the current in the primary winding L11 which steadily increases until the switching device Tr11 opens, at which time the current rapidly drops to zero. FIG. 4C shows the current in the secondary winding L12 which, at t1, rapidly increases to a predetermined value and then steadily decreases to zero at t2. FIG. 4D shows the auxiliary voltage $V_{AUX}$ generated by the auxiliary winding L14 which is representative of the DC output voltage from the secondary winding L12. When the switching device Tr11 opens, the auxiliary voltage $V_{AUX}$ rapidly rises to its nominal regulation value $V_{REF}$, which is equivalent to $I_{REF}$. When the auxiliary voltage $V_{AUX}$ rises above 83% of the nominal regulation value, the current $I_{AUX}$ at the first output 76 of the second current mirror exceeds that of the first current source 78 and causes the buffer 80 to apply a high level signal to the AND-gate 82 which, in turn, closes the controllable switch Sw4 causing the sample-and-hold circuit to begin sampling the current $I_{AUX}$ supplied by the auxiliary winding L14 and storing the sampled signal on discharge capacitor C15. This sampling continues until the auxiliary voltage $V_{AUX}$ drops below the 83% level. However, as shown in FIG. 4D, the period between t2 and t3 includes a time when the auxiliary voltage $V_{AUX}$ begins to ring which leads to an incorrect sampled signal being stored on discharge capacitor C15.

Figure 5:
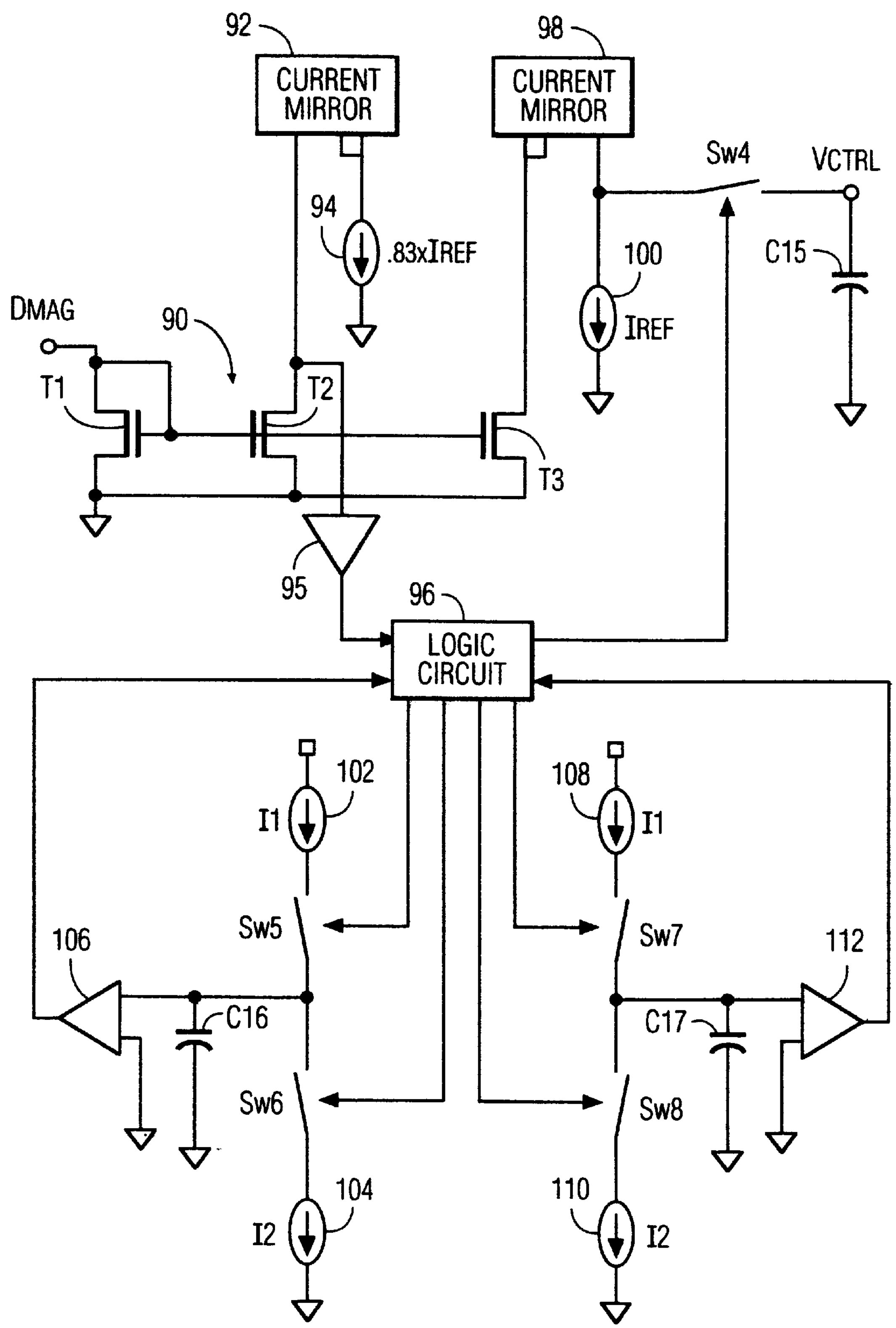
FIG. 5 is a schematic diagram of a sample-and-hold circuit in accordance with the subject invention.

The sample-and-hold circuit of the subject invention seeks to avoid these erroneous samplings. As shown in FIG. 5, an input of the sample-and-hold circuit, connected to the $D_{MAG}$ input of the controller IC, is connected to a current mirror circuit 90 formed by an input transistor T1 and two output transistors T2 and T3. The applied current $I_{AUX}$ from transistor T2 is compared, in current comparator 95, to the current $0.83*I_{REF}$ which is supplied by a current source 94 and mirrored by current mirror 92. When the $I_{AUX}$ current exceeds $0.83*I_{REF}$, current comparator 95 applies a signal to a logic circuit 96, having an input connected to the output of transistor T2. The output from the transistor T3 of the current mirror circuit 90 is applied to an input of a second current mirror 98, having an output connected to a current source for generating the current $I_{REF}$. The output from the second current mirror 98 is also connected to an input of the controllable switch Sw4, having a control input connected to an output of the logic circuit 96, and an output terminal forming the output of the sample-and-hold circuit which is, in turn, connected to the $V_{CTRL}$ terminal of the controller IC having the discharge capacitor C15 connected thereto.

In order to further control the switching of the controllable switch Sw4, the sample-and-hold circuit includes the series arrangement of a current source 102 for generating a current I1, a first controllable switch Sw5, a second controllable switch Sw6 and a current source 104 for generating a current I2. the junction between the first and second controllable switches Sw5 and Sw6 is connected to ground through a capacitor C16 and to a first input of a comparator 106, having a second input connected to ground. The output from the comparator 106 is connected to an input of the logic circuit 96. The first and second controllable switches Sw5 and Sw6 have control inputs connected, respectively, to outputs from the logic circuit 96. Similarly, the sample-and-hold circuit includes the series arrangement of a current source 108 also providing the current Ii, third and fourth controllable switches Sw7 and Sw8, and a current source 110 providing the current I2. The junction between the third and fourth controllable switches Sw7 and Sw8 is connected to ground through a capacitor C16 and to a first input of a comparator 112, having a second input connected to ground. The output from the comparator 112 is connected to another input of the logic circuit 96. The third and fourth controllable switches Sw7 and Sw8 have control inputs which are connected, respectively, to outputs of the logic circuit 96. The capacitors C16 and C17 have the same capacitance value.

In a switched-mode power supply, due to the output capacitor C12 having a high value, the change in the DC output voltage is small from one cycle to the next, unless a special situation occurs, e.g., a short circuit at the output. With this in mind, a circuit with two time constants is implemented. In particular, one time constant ($\tau 1$) is produced by the current source 102 (108) and the capacitor C16 (C17) while the other time constant ($\tau 2$) is produced by the current source 104 (110) and the capacitor C16 (C17). The currents II and I2 and the capacitors C16 and C17 are dimensioned such that the time constant $\tau 1$ is equal to the time interval from, for example, t1 to t3, and the time constant $\tau 2$ is equal to the time interval from t1 to t2.

In operation, referring to FIGS. 4E and 4F, the logic circuit 96 closes the controllable switches Sw4 and Sw5 (controllable switch Sw6 having already been opened) when the input current $I_{AUX}$ to current mirror 92 exceeds $0.83*I_{REF}$ (t1), causing the current source 102 to charge the capacitor C16 at the first time constant $\tau 1$. At the same time, the logic circuit 96 closes the fourth controllable switch Sw8 causing the current source 110 to discharge the capacitor C17 at the second time constant $\tau 2$. When the voltage across capacitor C17 reaches zero, the signal from the comparator 112 causes the logic circuit 96 to open the controllable switches Sw4 and Sw8. Then when the current $I_{AUX}$ drops below $0.83*I_{REF}$, the logic circuit opens switch Sw5. In the next cycle, the logic circuit 96 closes the controllable switches Sw4 and Sw7 (controllable switch Sw8 having already been opened) when the input current $I_{AUX}$ to current mirror 92 exceeds $0.83*I_{REF}$ (t1), causing the current source 108 to charge the capacitor C17 at the first time constant $\tau 1$. At the same time, the logic circuit 96 closes the fourth controllable switch Sw6 causing the current source 104 to discharge the capacitor C16 at the second time constant $\tau 2$. When the voltage across capacitor C16 reaches zero, the signal from the comparator 106 causes the logic circuit 96 to open the controllable switches Sw4 and Sw6. When $I_{AUX}$ drops below $0.83*I_{REF}$, the logic circuit 96 opens the controllable switch Sw7. FIG. 4G shows the switching signal applied to the controllable switch Sw4 by the logic circuit 96. As shown, the controllable switch Sw4 is closed only during the time t1 to t2 (t4 to t5), and as such, the erroneous value of the current $I_{AUX}$ occurring between t2 and t3 (t5 and t6) does not affect the sampled signal stored on the discharge capacitor C15.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A switched-mode power supply comprising:

a transformer having a primary winding, a secondary winding, and an auxiliary winding, the secondary winding being coupled to a smoothing capacitor via a rectifier element to supply a DC output voltage;

a switching device having a main current path arranged in series with the primary winding of the transformer; and a controller circuit having an output for supplying a drive signal to a control input of the switching device for periodically switching the switching device on and off, and an input coupled to the auxiliary winding of the transformer for receiving information indicative of the DC output voltage, said controller circuit controlling the on and/or off periods of the switching device in order to obtain a desired value of the information from the auxiliary winding in a steady state situation, wherein said controller circuit comprises:

a sample-and-hold circuit for periodically sampling said information at the input of said controller circuit;

storage means coupled to an output of said sample-and-hold circuit for storing a sampled signal; and means coupled to said storage means for generating the drive signal applied to the output of said controller circuit, and wherein said sample-and-hold circuit comprises:

means for controlling said sample-and-hold circuit to sample said information when said switching device is off and only when current is flowing in said secondary winding, thereby preventing sampling when said information is erroneous due to ringing in a voltage of the auxiliary winding.

2. A switched-mode power supply as claimed in claim 1, wherein said controlling means comprises:

means for detecting when a current in said auxiliary winding exceeds a predetermined level, said detecting means indicating a start of a sampling period; and timer means for measuring a predetermined time interval after said current in said auxiliary winding exceeds said predetermined level, said predetermined time interval being substantially equal to a time interval during which current is flowing in said secondary winding, said timer means indicating an end of said sampling period.

3. A switched-mode power supply as claimed in claim 2, wherein said timer means comprises:

a capacitance;

means for charging said capacitance to a predetermined level at a first time constant; and means for discharging said capacitance from said predetermined level at a second time constant, wherein said first time constant is greater than said second time constant, and said second time constant is equal to the amount of time current is flowing in said secondary winding after said switching device is turned off, said timer means indicating an end of said sampling period when a voltage across said capacitance reaches zero.

4. A switched-mode power supply as claimed in claim 3, wherein said timer means further comprises:

a further capacitance;

further means for charging said further capacitance to said predetermined level at said first time constant; and further means for discharging said further capacitance from said predetermined level at said second time constant, wherein during alternate cycles of said switching device being turned off, said discharging means discharges said capacitance while said further charging means charges said further capacitance, and during intervening cycles of said switching device being turned off, said charging means charges said capacitance and said further discharging means discharges said further capacitance, wherein in successive cycles of said switching device being turned off, said timer means alternately detects when a voltage across the capacitance and the further capacitance reaches zero.

* * * * *